INVENTOR.
Walter J. Wachowitz,

Patented Nov. 21, 1944

2,363,102

UNITED STATES PATENT OFFICE 2,363,102

ABRADING TOOL

Walter J. Wachowitz, Waukesha, Wis.

Original application August 10, 1939, Serial No. 289,403, now Patent No. 2,291,666, dated August 4, 1942. Divided and this application June 5, 1942, Serial No. 445,875

2 Claims. (Cl. 51—181)

The present invention relates to an abrading tool and more particularly is directed to an abrading tool adapted for facing metal tubing having ferrules or other coupling members secured to the ends thereof.

The present application is a division of my copending application Serial No. 289,403, filed August 10, 1939, for an improvement in Clamping device, now issued as Patent No. 2,291,666, dated August 4, 1942.

It is an object of my invention to provide an abrading tool comprising a body having an exterior conical friction surface and an interior conical friction surface for facing internal and external conical surfaces of objects, such as metal tubing, having male and female ferrules secured to the ends thereof. More specifically, the body of my abrading tool is formed of an elastic material of considerable rigidity and appreciable elasticity facilitating facing of the object being worked upon. Still more specifically, the body of my abrading tool is provided with a pressure resistant sleeve which is adapted to fit about a spindle to secure the body thereto to be driven by power applied to the spindle.

Further objects and advantages of my invention will appear from the detail description.

Figure 1:
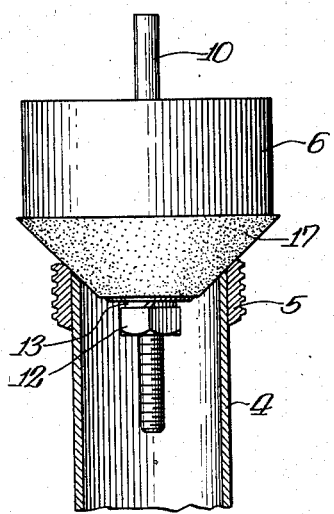
Figure 2:
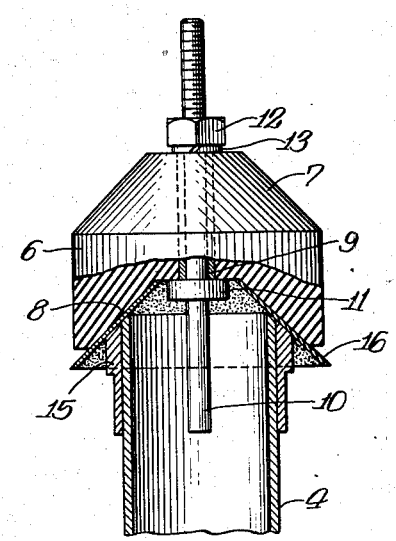
Figure 3:
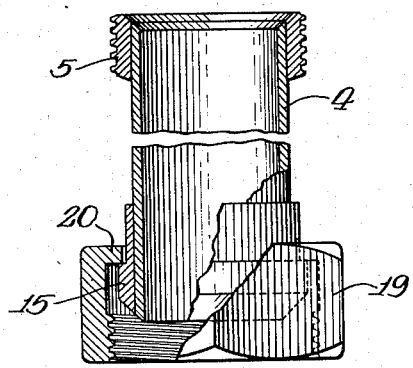

Figure 1 is a lengthwise sectional view through a tube and a ferrule applied to one end thereof showing the use of the facing tool, the latter being shown in elevation;

Figure 2 is a lengthwise sectional view through a tube and a ferrule applied thereto, of different type than the ferrule of Figure 1, showing the use of the abrading tool, the latter being shown in elevation and partly broken away and in section; and Figure 3 is a lengthwise sectional view through a tube, partly broken away, with the ferrules of Figures 1 and 2 applied to the ends of the tube, and a coupling nut associated with one of the ferrules, the nut being shown partly in elevation and partly broken away and in section.

In my copending application above referred to I have disclosed a clamping device for holding a metal tube and a ferrule in position to be secured together by expanding the end of the tube into the ferrule. Also, in the aforesaid application a suitable saw guide is provided for cutting off the tubing adjacent the end of the ferrule, and in my copending application Serial No. 445,874, filed June 5, 1942, there is disclosed a reamer suitable for reaming away the saw marks and for preparing the end of the tube preliminarily to facing of the end of the tubing and the ferrule. The abrading tool of the present invention is particularly adapted for use in facing the end of a tubing having a ferrule applied thereto and reamed as disclosed in my above referred to application.

In Figure 1 the tubing 4 has been provided with a female ferrule 5, it being understood that the end of the tubing 4 and the ferrule 5 have previously been reamed, preferably in the manner described in my copending application Serial No. 445,874, filed June 5, 1942, to form an inclined conical surface. The abrading tool comprises a body 6 preferably of cylindrical shape as shown, having at one end a frusto-conical extension 7 and provided, in its other end, with a frusto-conical recess 8 coaxial with extension 7. A rigid pressure resistant sleeve 9, formed of brass or other suitable material, extends through body 6, and extension 7 thereof coaxially therewith, one end of this sleeve being flush with the inner base of the conical recess 8 and the other end of sleeve 9 being flush with the outer base of extension 7. Sleeve 9 is secured to body 6 and extension 7 thereof in a suitable known manner, body 6 and extension 7 preferably being formed of elastic friction material, such as a suitable rubber composition, and possessing considerable rigidity as well as appreciable elasticity. A spindle 10 extends through sleeve 9 and is provided a short distance from one end with a collar 11 formed integral with or otherwise suitably secured to the spindle 10. The other end portion of spindle 10 is suitably threaded and receives a nut 12 which bears upon a spring washer 13 confined between the nut and the adjacent end of sleeve 9. By turning nut 12 tightly on to the spindle, sleeve 9 is clamped to the spindle for rotation therewith. Either end of spindle 10 may be gripped in the chuck of a brace or other suitable tool for rotating the spindle and with it the body 6 and extension 7 thereof.

The inclination of the frusto-conical recess 8 corresponds to the inclination of the conical surface of male ferrule 15 shown in Figure 2 of the drawing. It will be understood that the male ferrule 15 is applied to the end of the tubing in the manner previously referred to in connection with the female ferrule 5, all as more clearly disclosed in my first referred copending application. This recess 8 receives an emery paper or cloth cone 16 bearing upon its inner surface and exposed at the interior of recess 8, emery or other suitable abrasive, the inclination of the cone 16 corresponding to the inclination of recess 8. Thus, after the end of tubing 4 has been reamed off beyond the ferrule 15, the abrading tool is disposed so that the abrasive surface of cone 16 contacts the end of tubing 4, and the tool is then rotated until the end of tube 4 has been shaped accurately so as to provide a continuation of the frusto-conical surface of ferrule 15, the latter surface and the beveled surface of the end of the tube then together form a continuous and smooth conical surface, as will be clear from Figures 2 and 3. When it is desired to dress or face the end of tube 4 in the female ferrule 5, a cone 17, corresponding to extension 7 of body 6, is placed over this extension, the inclination of which and of the cone corresponds to the bevel of the conical inner surface at the outer end of ferrule 5, after which the tool is rotated until the end of the tube 4 has been reshaped or beveled to a proper extent to provide a continuation of the conical surface of ferrule 5, the latter surface and the beveled surface of the tube then together providing a continuous and smooth conical surface, as will be clear from Figures 1 and 3. In that manner the ends of the tube and the ferrules may be dressed or faced with expedition and facility so as to provide continuous and accurately formed conical surfaces such that the conical surfaces of the ferrule 5 and the contiguous end of the tube will fit accurately into the conical surface of recess of ferrule 15 and the contiguous end of the tube. That assures accuracy in the fit between the parts coupled together, such as to eliminate any spaces or openings therebetween of an objectionable character. The shouldered ferrule 15 is intended for reception of a coupling nut 19 provided, at one end, with an inwardly extending flange 20 for engagement behind a shoulder of ferrule 15, this nut being interiorly threaded for screwing onto a ferrule 5 for coupling together two lengths of tubing 4, the coupling nut and the ferrule thus constituting a union between the lengths of tubing.

While I have disclosed the abrading tool of my invention, by way of example, for use in facing the ends of straight tubing having ferrules or like members secured to its ends, it will be understood that this is by way of example only and that the abrading tool of my invention may be adapted for other uses.

I claim:

1. In a tool for facing frusto-conical surfaces, a spindle having a fixed stop collar, a substantially solid resilient body of considerable rigidity and appreciable elasticity having at one end a frusto-conical extension providing an exterior continuous frusto-conical surface having a high coefficient of friction adapted to support a correspondingly shaped abrasive member by frictional engagement therewith and, at its other end, a frusto-conical recess providing an interior continuous frusto-conical surface having a high coefficient of friction adapted to support a correspondingly shaped abrasive member by frictional engagement therewith, a substantially cylindrical recess extending through said body coaxially of said frusto-conical surfaces, a rigid pressure resistant sleeve extending through and being secured in said recess of said body and fitting about said spindle with one end in contact with said collar, and securing means contacting the other end of said sleeve comprising a nut screwing on said spindle effective for clamping said sleeve to said spindle under endwise pressure between said collar and said securing means.

2. A resilient member for use in facing frusto-conical surfaces, said member possessing considerable rigidity and appreciable elasticity and comprising a substantially solid body having at one end a frusto-conical extension providing an exterior continuous frusto-conical surface having a high coefficient of friction adapted to support a correspondingly shaped abrasive member by frictional engagement therewith and, at its other end, a frusto-conical recess providing an interior continuous frusto-conical surface having a high coefficient of friction adapted to support a correspondingly shaped abrasive member by frictional engagement therewith, a substantially cylindrical recess extending through said body coaxially of said frusto-conical surfaces, and a pressure resistant sleeve extending through and being secured in said recess of said body with one end of said sleeve terminating at the outer base of said extension and the other end of said sleeve terminating at the inner base of said frusto-conical recess.

WALTER J. WACHOWITZ.